US012517934B2

United States Patent
Edwards et al.

(10) Patent No.: US 12,517,934 B2
(45) Date of Patent: Jan. 6, 2026

(54) MULTI-MODAL EMBEDDINGS OF USER INTERACTIONS

(71) Applicant: Capital One Services, LLC, McLean, VA (US)

(72) Inventors: Joshua Edwards, Philadelphia, PA (US); James O. H. Montgomery, Vienna, VA (US); Gang Mei, Ellicot City, MD (US)

(73) Assignee: Capital One Services, LLC, McLean, VA (US)

( * ) Notice: Subject to any disclaimer, the term of this patent is extended or adjusted under 35 U.S.C. 154(b) by 210 days.

(21) Appl. No.: 18/380,966

(22) Filed: Oct. 17, 2023

(65) Prior Publication Data

US 2025/0124061 A1 Apr. 17, 2025

(51) Int. Cl.
*G06F 17/27* (2006.01)
*G06F 16/3329* (2025.01)
(Continued)

(52) U.S. Cl.
CPC .......... *G06F 16/3329* (2019.01); *G06F 40/30* (2020.01); *H04L 51/02* (2013.01); *H04M 3/493* (2013.01)

(58) Field of Classification Search
CPC .... G06F 16/3329; G06F 40/30; G06F 3/0484; H04L 51/02; H04M 3/493
(Continued)

(56) References Cited

U.S. PATENT DOCUMENTS 11,436,416 B2 9/2022 Beaver
11,477,142 B1 10/2022 Lewis et al.
(Continued)

FOREIGN PATENT DOCUMENTS

KR 20240138669 A * 9/2024 ............ G10L 15/22

OTHER PUBLICATIONS

Sam Sharpe "Machine Learning for Temporal Data in Finance" Capital One, https://www.capitalone.com/tech/machine-learning/machine-learning-for-temporal-data-in-finance/, Nov. 23, 2020, pp. 1-16.
(Continued)

*Primary Examiner* — Md S Elahee
(74) *Attorney, Agent, or Firm* — Banner & Witcoff, Ltd.

(57) ABSTRACT

Aspects described herein may improve predictions of real-time user intent by generating multi-modal embeddings based on previous user interactions. The previous user interaction data may be received from multiple different modalities. The interaction data may be analyzed and labeled with user intent for each previous user interaction, then sequentially organized. The multi-modal embeddings may be generated by modal-specific encoders and a multi-modal embeddings generator. A trained machine learning model may use, as input, the multi-modal embeddings and personal data to determine real-time user intent at the beginning of an interaction. The multi-modal embeddings may act as a set of unique and specific output vectors that allow a computing device to recognize and correlate synonymous terms and interrelated subjects, usually a difficult task for computing devices, thereby improving the technological process of analyzing, in real-time, user intent.

20 Claims, 5 Drawing Sheets

(51) Int. Cl.
  *G06F 40/30*   (2020.01)
  *H04L 51/02*   (2022.01)
  *H04M 3/493*   (2006.01)

(58) Field of Classification Search
  USPC .............................................................. 704/9
  See application file for complete search history.

(56) References Cited

U.S. PATENT DOCUMENTS

| | | |
|---|---|---|
| 11,562,243 B2 | 1/2023 | He et al. |
| 11,563,852 B1 | 1/2023 | Can et al. |
| 2022/0155926 A1* | 5/2022 | Bhatt .................... G06F 3/0484 |
| 2025/0111145 A1* | 4/2025 | Londner ................ G06F 40/30 |

OTHER PUBLICATIONS

Alec Radford et al. "Learning Transferable Visual Models From Natural Language Supervision" Feb. 26, 2021, pp. 1-48 available at https://arxiv.org/pdf/2103.00020.pdf.

* cited by examiner

MULTI-MODAL EMBEDDINGS OF USER INTERACTIONS

Aspects of the disclosure relate generally to predicting user intent from the user's previous interactions. More specifically, aspects of the disclosure may relate to generating, from the user's previous interactions, sequential multi-modal embeddings that are used by a machine learning model to predict user intent in real-time.

BACKGROUND OF THE INVENTION

Currently, computing devices have a difficult time determining a correct meaning during a semantic analysis of user-inputted text. User-inputted text, received as text via a chatbot or via an audio file, may contain colloquialisms, homonyms, polysemes, local dialects, idiomatic expressions, slang, and similar linguistic styles, which may give rise to multiple and/or different meanings when analyzed for intent. Additionally, different syntax structures within the user-inputted text may also confuse the computing device, obscuring the true meaning behind the words. For example, "apple" may refer to a fruit or a technology company. "A piece of cake" may mean a dessert or that something was easy to do. A "set" may refer to a collection of objects or the place where a play takes place. Furthermore, these linguistic issues may be unique to a specific user, due to the user's distinctive pronunciation, regional dialects, and/or other personal characteristics. Additionally, computing devices struggle to correlate synonymous interrelated subjects. For example, if the user requests information regarding paying for college education, current computer analysis may generate and present student loan information, in addition to information related to 529 educational savings accounts.

Therefore, there is a need to develop improved speech and/or text analysis incorporating unique user data to accurately determine real-time user intent.

SUMMARY OF THE INVENTION

Aspects described herein may address these and other problems, and generally improve the quality, efficiency, and speed with which computing devices, through the use of machine learning models, may understand a user's intent based on the user's particular linguistic style as well as updated personal information. This is accomplished, in part, by employing multi-modal embeddings using time-sequenced historic user data. Multi-modal embeddings are a unique set of generated output vectors which, when employed, may allow a computing device to recognize and correlate synonymous terms and interrelated subjects, normally a difficult task for computing devices to accomplish. Further, the multi-modal embeddings may allow the computing device to correctly determine the meaning of a user's input, for example, during a semantic analysis of the user input containing colloquialisms, homonyms, polysemes, local dialects, idiomatic expressions, slang, and/or similar linguistic styles. Understanding the meaning behind the user's input allows the computing device to more accurately predict user intent at the beginning of an interaction.

In providing real-time user intent predictions, the method may generate unique, time-sequenced multi-modal embeddings based on the user's intent during previous interactions. The multi-modal embeddings may be generated using modal-specific encoders which map the previously labeled data for user intent into a space common to all modalities. The multi-modal embeddings may be entered, downstream, into a trained machine learning model in order to determine present user intent.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

After receiving, from a user device, a request for information, a computing device may retrieve a first set of multi-modal embeddings from an associated database. The first set of multi-modal embeddings may have been previously generated by the computing device. In generating the first set of multi-modal embeddings, the computing device may receive first timestamped data associated with a user's first interaction. The computing device may analyze the first timestamped data for user intent during the user's first interaction. The computing device may then assign, to the first timestamped data, a label associated with the user intent during the user's first interaction. The computing device may repeat the process of receiving timestamped data associated with a user's interaction, analyzing the data for user intent, and/or labeling the data with the user's intent on one or more additional timestamped data. The computing device may convert the data timestamps into a common format. After which, the computing device may organize the timestamped data into sequential order. Ordering the data in sequential order may allow for more accurate real-time predictions of user intent.

After the timestamped data has been analyzed for user intent, labeled with user intent, and/or organized in sequential order, the computing device may, using modal-specific encoders, map the timestamped data with associated intent labels into a shared vector space. The encoders may be specific to each data modal. For example, text data may employ a text encoder, and audio data may employ an audio encoder. After the data and associated intent labels have been mapped into the shared vector space, the computing device may, using a multi-modal embeddings generator, generate a first set of multi-modal embeddings by correlating the received data and associated labels. Subsequently, the computing device may save the first set of multi-modal embeddings, now time sequenced and unique to the user's interactions, to a database.

After receiving, in real-time, a request from a user, and after retrieving the first set of multi-modal embeddings, the computing device may input the first set of multi-modal embeddings into a machine learning model, trained to predict user intent. The computing device may also use personal information, associated with the user, as input to the machine learning model. The machine learning model may generate one more predictions of user intent and a likelihood probability for each prediction of user intent. After generating the predicted user intent, a computing device may provide, to the user device, information relevant to the predicted user intent. Further, the computing device may generate a second set of multi-modal embeddings, as described above, using the real-time request and prediction of user intent. The computing device may generate, from the first set of multi-modal embeddings and the second set of multi-modal embeddings, a third set of multi-modal embeddings. The third set of multi-modal embeddings may comprise all of the user's interaction data as a complete set of multi-modal embeddings, thereby preserving the unique characteristics of the generated multi-modal embeddings relative to the user. By generating and updating unique-to-the-user multi-modal embeddings, real-time intent analysis may be improved.

Further aspects described herein may provide for generating multi-modal embeddings, using a user's unique interaction history as input. For example, after receiving first data associated with a user's first interaction, a computing device may analyze the data for user intent. The computing device may assign one or more first labels to the first data. The one or more first labels may comprise user intent data associated with the first interaction. Additionally, after receiving second data associated with a user's second interaction, the computing device may analyze the second data for user intent. The computing device may assign one or more second labels to the second data. The one or more second labels may comprise intent data associated with the second interaction. Next, the computing device may convert timestamps associated with the first data and the second data into a common format. The computing device may organize the first data and the second data into a sequential order using the converted timestamps. After organizing the first data and the second data into sequential order, the computing device may encode (map) the first data and the second data, as well as the one or more first labels and the one or more second labels, into a common vector space using a modal-specific data encoder. For example, the first interaction may have been through an online chatbot, and the second interaction may have been a phone call to a live help desk operator (technician, representative). The first modal-specific data encoder may be configured to encode text data, whereas the second modal-specific data encoder may be configured to encode data in audio formats. Using a multi-modal embeddings generator, which analyzes the mapped multi-modal data in the shared vector space, the computing device may generate a first set of multi-modal embeddings based on previously analyzed user interaction data. The previously analyzed user interaction data may help the machine learning model predict the user's intent. The multi-modal generator may correlate the first data and the one or more first labels with the second data and the one or more second labels while maintaining the time sequence of the multi-modal data. Maintaining the time sequence for the multi-modal data allows for more accurate predictions of current user intent thereby improving real-time intent analysis. Further, the first set of multi-modal embeddings may be generated from one or more data sets.

After generating the first set of multi-modal embeddings and training the machine learning model, the first set of multi-modal embeddings and/or the trained machine learning model may be deployed as service (e.g., a Software-as-a-Service (SaaS)) offered through, for example, a mobile application, a website, a web portal, etc. The service may receive a request for information. Upon receiving the request, the service may input the first set of multi-modal embeddings into the trained machine learning model to determine a prediction of the user's current intent. Based on the prediction of the user's current intent (e.g., the reason for the user's current interaction), the service may send a response to the user. The response may comprise, for example, offering multiple recommended phrases to the chatbot.

As noted above, the present disclosure describes a method of predicting real-time user intent. For example, a computing device may receive, from a user device, a request for information. In response to receiving the request, the computing device may generate, using multi-modal embeddings that correlate intent data from the user's previous interactions, one or more predictions regarding the user's intent (reason) for the current request for information. The computing device may also generate a likelihood probability for each of the one or more predictions. After determining a first prediction of user intent associated with the highest likelihood probability, the computing device may send, to the user device, a response to the request for information. The response may comprise, for example, one or more responses from a chatbot.

According to some embodiments, the computing device may analyze first data for user intent to assign one or more first labels to the first data. Further, the computing device may analyze second data for user intent to assign one or more second labels to the second data. Additionally, the computing device may analyze third data for user intent to assign one or more third labels to the third data. After labeling the data, the computing device may sequentially organize the first data, the one or more first labels, the second data, the one or more second labels, the third data, and/or the one or more third labels via timestamps associated with the first data, the second data, and the third data.

In some examples, sequentially ordering user interaction data may comprise converting a first plurality of timestamps associated with the first data into a common format, converting a second plurality of timestamps associated with the second data into the common format, and/or converting a third plurality of timestamps associated with the third data into the common format. After converting the above plurality of timestamps into the common format, the computing device may sequentially organize the first data, the second data, and/or the third data, according to the converted timestamps. Further, the timestamps may be used to generate time specific features, such as time interval tokens.

After sequentially ordering the received data and associated labels, the computing device may convert the data by a modal-specific encoder. For example, the first data may be encoded by a text encoder; the second data may be encoded by an audio encoder; the third data may be encoded by a video encoder. After the user data has been converted, the computing device may input the time sequenced and converted multi-modal data into a multi-modal embeddings generator. The multi-modal embeddings generator may correlate the first data and one or more first labels, with the second data and the one or more second labels, and/or the third data and one or more third labels. After generating the unique, user-specific multi-modal embeddings, the computing device may input the multi-modal embeddings into a trained machine learning model to determine a real-time prediction of user intent.

Additionally, the multi-modal embeddings generator may comprise one or more of natural language processing algorithms (models), recurrent neural networks (RNNs), a convolutional neural network (CNN) model, feed-forward neural networks, long short-term memory (LSTM), gated recurrent units (GRUs), masked language models (MLMs), hidden Markov models (HMMs), regression models, and correlation analysis. Further, the multi-modal embeddings generator may leverage pre-training tasks by employing one or more techniques such as reconstruction, bag of words (BoW), translation language modeling (TLM), next step predication (NSP), causal language modeling (CLM), sequence to sequence (Seq2Seq), noise contrastive estimation (NCE), permutation language modeling (PLM), rotation prediction, cluster assignments, continuous bag of words (CBOW), skip-gram, and span boundary objective (SBO). The machine learning models may be trained by supervised learning, unsupervised learning, semi-supervised learning, or reinforcement learning structures.

In some instances, generating one or more predictions regarding the user's intent may use one or more second users' multi-modal embeddings to determine the user's intent. Additionally, the one or more first labels may correspond to a first predicted user intent for the user's interaction with the webpage, and the one or more second labels may correspond to a second predicted user intent for the user's interaction with the agent. Further, the agent may comprise one or more of an automated voice response (AVR) service, a chatbot, or a customer service representative.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques improve the quality, efficiency, and speed with which computing devices, through the use of machine learning models, may understand a user's intent based on the user's use of colloquialisms, homonyms, polysemes, local dialects, idiomatic expressions, and slang in speech and/or text. By providing accurate, real-time predictions of user intent, this combination of features may allow for providing greater customer care, improve user retention rates, and limit unnecessary resource expenditures. For example, by quickly and efficiently guiding users in an appropriate direction at the beginning of a user interaction, the method may provide greater user care and optimal user experience, thereby increasing user retention rate.

Before discussing these concepts in greater detail, however, several examples of a computing device that may be used in implementing and/or otherwise providing various aspects of the disclosure will first be discussed with respect to FIG. 1.

Figure 1:
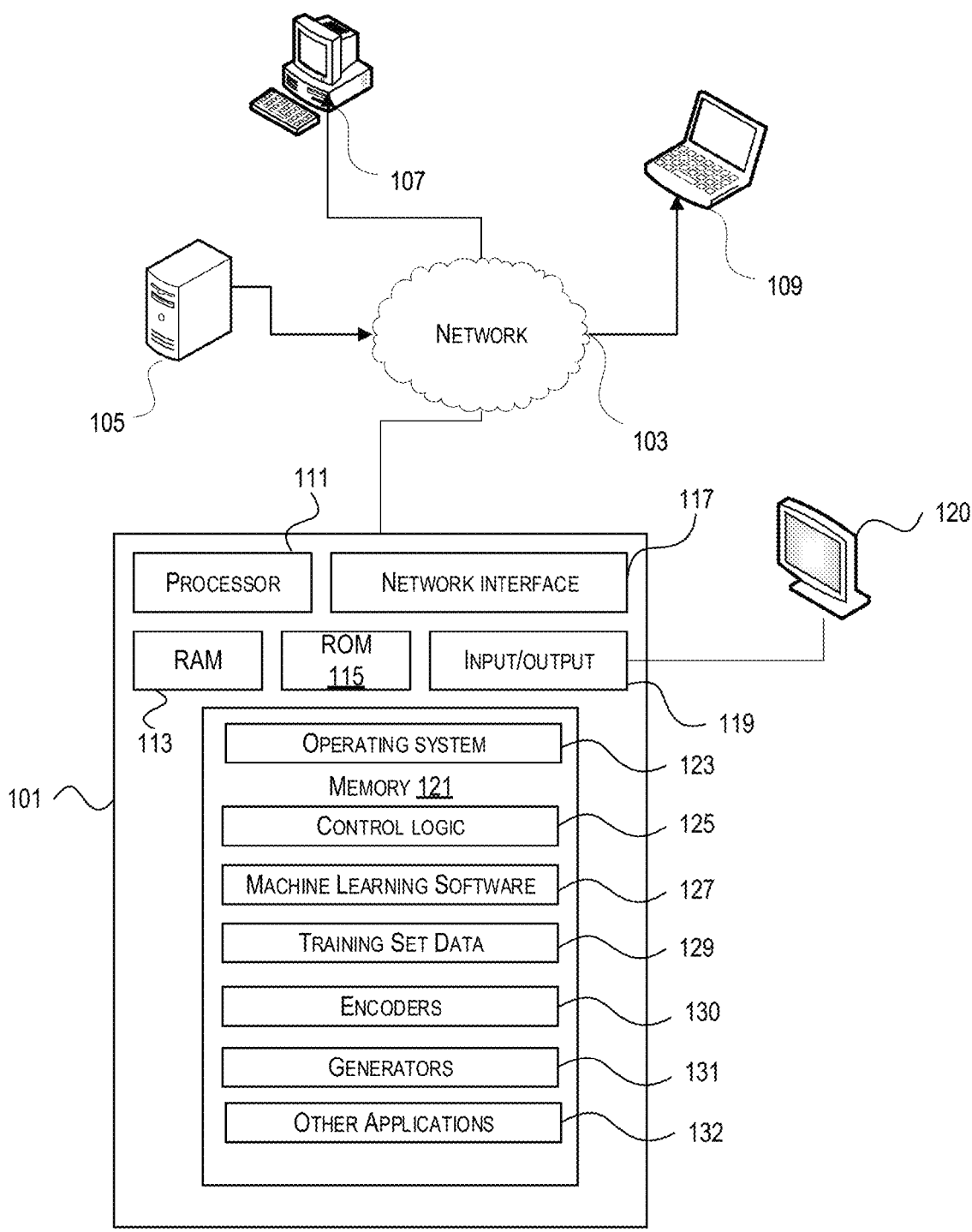
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display, such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning model 127, training datasets 129, encoders 130, generators 131, and/or other applications 132. Control logic 125 may be incorporated in and may be a part of machine learning model 127. As will be discussed in greater detail below, machine learning model 127 may include one or more of a generative adversarial network (GAN) model, a convolutional neural network (CNN) model, a recurrent neural network (RNN) model, masked language model (MLM), a random forest model, an autoencoder model, a variational autoencoder model, a synthetic data model, a deep learning architecture, an artificial neural network, or the like. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, Perl, or any equivalent thereof. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

The data transferred to and from various computing devices in operating environment 100 may include secure and sensitive data, such as confidential documents, user personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

A company may offer a service that predicts, in real-time, user intent for current user interactions. Based on time-sequenced, historical user data, previously analyzed and labeled with associated user intent, the service may generate multi-modal embeddings for use in trained machine learning models to predict current user intent. The machine learning model may comprise one or more AI models such as generative adversarial network (GAN) models, a convolutional neural network (CNN) models, recurrent neural network (RNN) models, masked language models (MLMs), feed-forward neural networks, long short term memory (LSTM), gated recurrent units (GRUs), hidden Markov models (HMMs), regression models, correlation analysis multi-layer perceptions (MLP), random forest models, gaussian mixture models (GMMs), autoencoder models, variational autoencoder model (VAEs), k-nearest neighbors models (kNNs), k-means models, synthetic data models, support vector machine models (SVMs), deep learning architectures, any artificial neural network, or the like. The GAN model may include conditional GANs (cGAN), deep convolutional GANs (DCGAN), self-attention GANS (SA-GAN), Flow-GANs, variational autoencoder GANs (VAE-GAN), transformer GANs (TransGAN), or the like. Further, the machine learning model may comprise one or more of gradient descent algorithms, such as a stochastic gradient descent, differentiable generator networks, Bayesian network models, support vector machines (SVMs), logistic regression analysis, decision trees, relevance vector machines (RVMs), backpropagation methods, feed-forward methods, speech-to-text algorithms, or the like. Regression, classification, clustering and/or decision-making algorithms may be included in the one or more machine learning models. Additionally, the machine learning model may include one or more classification models, which may be based on one or more neural network algorithms, hierarchical attention network algorithms (HAN), support vector machines (SVMs), Bayes classifiers, binary classifiers, or the like. The machine learning models may be trained by supervised learning, unsupervised learning, semi-supervised learning, or reinforcement learning structures. Additionally, the multi-modal embeddings generator may leverage pre-training tasks by employing one or more techniques such as reconstruction, bag of words (BoW), translation language modeling (TLM), next step predication (NSP), causal language modeling (CLM), sequence to sequence (Seq2Seq), noise contrastive estimation (NCE), permutation language modeling (PLM), rotation prediction, cluster assignments, continuous bag of words (CBOW), skip-gram, and span boundary objective (SBO).

A computing device may use one or more training datasets 129 to train the machine learning model 127 to generate real-time user intent. The one or more training datasets 129 may comprise one or more ground-truth datasets including datasets comprising user data, previously generated datasets, consumer produced datasets, and/or the like. The user data may be data associated with a current user and/or data associated with one or more other users. The other users may share the same age, educational level, employment, socio-economic status, and/or other demographics. User data (personal information) may be acquired, for example, during opening an account, as part of a Know Your Customer (KYC) process, and/or using additional information gathering methods. Further, information for the datasets may be acquired through commercial establishments, public government databases, and/or crowdsourcing platforms. The one or more training datasets 129 may be structured, unstructured, and/or semi-structured data. The one or more training datasets 129 may be tagged to identify particular characteristics, associations, correlations, transactions, locations, and/or the like. Tagging refers to labeling and/or annotating data appropriate for the particular purpose, including machine learning datasets, classifying and organizing data, and/or the like. Tagging may include identifying one or more particular attributes and/or features of each instance of data. Additionally or alternatively, tagging may identify one or more particular attributes and/or features shared by all the instances of data in the set (e.g., identifying the metadata).

For example, the computing device may use a scraping algorithm to obtain information from one or more associated databases. In other examples, computing device may use the scraping algorithm to obtain relevant information from public sources, such as the internet and social media platforms. Then the computing device may construct unique training datasets 129 from information received by the scraping algorithm. In this way, the unique training dataset 129 may be periodically updated and the machine learning model re-trained. The training datasets maybe labeled or unlabeled. The training data sets 129 may be used to train, test, refine, or retrain the machine learning model.

The one or more training datasets 129 may be produced by machine learning models, by persons, through aggregators, and/or the like. Further, the one or more training datasets 129 may be acquired from commercial establishments, public government databases, and/or crowdsourcing platforms. Additionally, the computing device may employ other types of datasets, such as validation datasets and test datasets, to fully train the machine learning model. Further, results generated from implementing a trained machine learning model may be used to either re-train or further train the machine learning model.

A computing device may use one or more encoders 130 and one or more generators 131 to create the multi-modal embeddings. Encoders may map data and associated labels into a common vector space. The encoders may be modal-related encoders, for example, a text encoder, an image encoder, an audio encoder, a video encoder, a transaction encoder, and/or another type of modal-specific encoders. The one or more generators may be a multi-modal embeddings generator. The multi-modal embeddings generator may generate multi-modal embeddings, which are vector representations of words to particular meanings, by correlating mapped first data and/or first labels with second data and/or second labels. For example, in analyzing and labeling different user interaction data sets for user intent, a multi-modal generator may create vector representations (embeddings) of user interactions to user intent. Consequently, by utilizing multi-modal embeddings, a computing device may be better able to recognize synonymous terms and interrelated subjects, thereby more accurately determining correct real-time user intent. Further, the multi-modal embeddings may be saved to a database, as part of other applications 132.

User interaction data may come from many different sources and in many different formats. For example, users may interact with a chatbot online producing data in a text format, which may be incorporated within a particular chatbot output format. Other times, users may communicate with a live help desk operator producing audio and/or video data. Often users update or interact with transactional forms, either online or via paper, which may employ optical character recognition (OCR), or the like, before the computing device may begin processing the data. Further, the user interaction data may by analyzed and labeled for user intent. Additionally, the data may be sequentially ordered to help determine current user intent. Encoders 130, which may be unique to particular modalities, may encode the data and associated intent labels into a multi-modal embeddings generator. The multi-modal embeddings generator may then create a series of multi-modal embeddings, time-sequenced and unique to the user. The multi-modal embeddings may then be used by machine learning models, artificial intelligence (AI), or the like for further data analysis. Personal data may be used as input for the trained machine learning model. For example, the multi-modal embeddings may be used to predict, in real-time, the user's intent. After the user interaction is completed, the computing device may update and/or correct the multi-modal embeddings for future use.

As the multi-modal embeddings contain the updated, time-sequenced history of user interactions, the multi-modal embeddings may be used in subsequent user analysis. For example, the multi-modal embeddings may be used to detect malicious actors by recognizing fraudulent transactions, account takeovers, identity theft, and other sinister actions. Further, the multi-modal embeddings may be used by AI technologies to more accurately target consumers for marketing advertisements and offers.

Having discussed several examples of computing devices which may be used to implement some aspects as discussed further below, discussion will now turn to a method for predicting, in real-time, user intent during a user interaction, thereby improving real-time analysis technologies.

Figure 2:
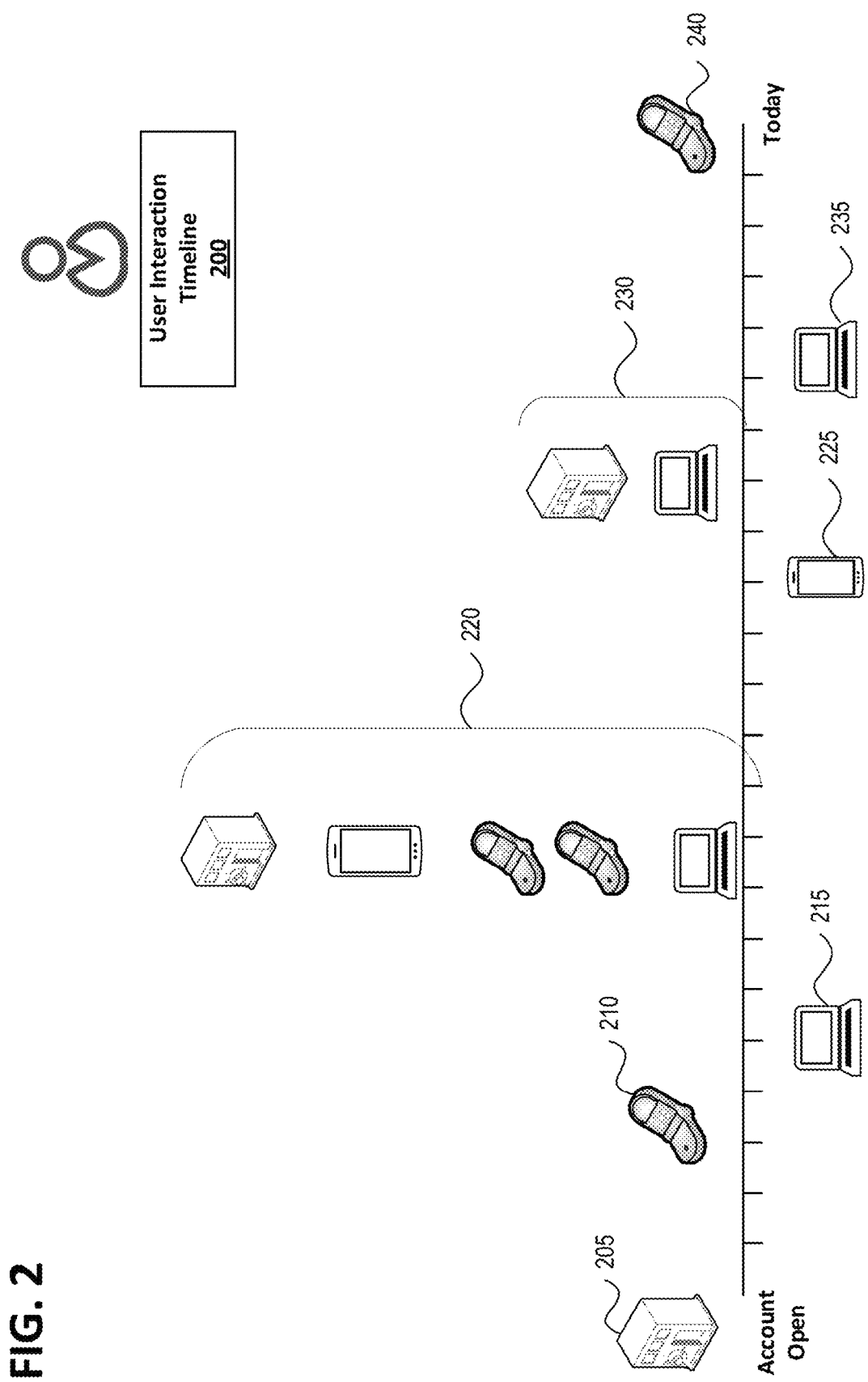
FIG. 2 depicts an example user interaction timeline according to one or more aspects of the disclosure.

FIG. 2 illustrates an example of a timeline (history) 200 of user interactions at the time of a user interaction at current time 240. At a first time 205, the user may have opened an account by interacting with a live operator. As part of the account opening process, a first set of data may be obtained. The first set of data may comprise transactional forms completed by the user, as well as notes on the interaction by the operator. Both the transactional forms and the operator's notes may comprise text data. A computing device may analyze and/or label the first set of data with user intent. For example, the user may have opened a checking account, and the transactional forms may incorporate information relating to the checking account, personal contact information, family details, employment, a federally required background check, a financial background check, and/or similar information. During the interaction the user may have also asked the operator about an auto loan, which the operator included in the notes. Additionally or alternatively, the labels may be created by humans. The computing device may analyze the first set of data and label the first set of data with the user's intent to open a checking account and an interest in auto loans. Further, the computing device may assign a first timestamp to the first set of data and save the first set of data to an associated database.

At a second time 210, the user may have called an automated line to inquire into auto loan rates. The user may have interacted with an automated voice response (AVR) service using a cell phone device. A second set of data from the interaction with the AVR service may comprise audio data. The computing device may analyze and label the second set of data with user intent to inquire about auto loans. Further, the computing device may assign a second timestamp the second set of data and save the second set of data to the associated database.

After analyzing the second set of data, the computing device may retrieve, from the associated database, the first set of data from user interaction at first time 205 and the second set of data from interaction at second time 210. The computing device may convert the first timestamp and the second timestamp to a common format. Next, the computing device may sequentially order, using the timestamps, the first set of data, and first labels, with the second set of data, and second labels. Additionally or alternatively, the computing device may employ the timestamps to generate time specific interaction features, such as time interval tokens. These time interval tokens may indicate unique time intervals between user interactions. The computing device may encode the first set of data, and associated labels, and the second set of data, and associated labels, using a modal-specific encoder. For example, the first set of data may utilize a text encoder and the second set of data may utilize an audio encoder. The encoded data may be input into a multi-modal embeddings generator to create a first set of multi-modal embeddings. The first set of multi-modal embeddings may be saved to the associated database.

At a third time 215, the user may communicate with a chatbot through an online service associated with the account. The computing device may retrieve, from the associated database, the first set of multi-modal embeddings and input the first set of multi-modal embeddings to a machine learning model. The computing device may also retrieve personal information from the associated database and input personal information into the machine learning model. The machine learning model may be trained to predict user intent. The computing device may use one or more training data sets to train the machine learning model to predict user intent.

The computing device may use additional information as input to the trained machine learning model to predict user intent. For example, the computing device may use the user's information gained from opening the account. Additionally, the computing device may use other users' sets of multi-modal embeddings as input to the machine learning model to determine current user intent. The other users may share similar characteristics to the user. For example, the user and the other users may share similar age, financial status, educational level, number of family members, marital status, employment status, locality, or another demographic characteristic. Further, the computing device may use current events as input to the machine learning model to determine current user intent. For example, the federal government may have recently proposed a plan to eliminate student debt. Determining that the user has a student loan and that the user recently called regarding the loan's status, the machine learning model may calculate a high probability that the user is calling about the steps needed to eliminate their student debt under the federal plan.

After the computing device inputs data into the trained machine learning model, as described above, the trained machine learning model may generate one or more predictions of current user intent and a likelihood probability for each prediction. The computing device may select the prediction associated with the highest likelihood probability.

The computing device may then retrieve information corresponding to the selected prediction and present the information to the user.

For example, at third time 215, the computing device may determine that the user intends to inquire about an auto loan. Further, the computing device may identify that the user is interacting with a chatbot. The computing device may send, to the user through the chatbot, an offer to learn more current auto loan rates. After (or during) the third time 215, the computing device may analyze a third set of data, corresponding to the third time 215 interaction, for user intent. The computing device may label the third set of data with one or more third labels with user intent and assign the third set of data a timestamp. Additionally, the computing device may, using a text encoder and the multi-modal embeddings generator, generate a second set of multi-modal embeddings using the third set of data and the one or more third labels. Afterwards, the computing device may generate a third set of multi-modal embeddings by sequentially ordering the first set of multi-modal embeddings and second set of multi-modal embeddings. Alternatively, the computing device may generate the third set of multi-modal embeddings by sequentially ordering the first set of data and one or more first labels, the second set of data and one or more second labels, and the third set of data and the one or more third labels. After which, the computing device may encode the sequential data using modal-specific encoders. The computing device may input the encoded data into the multi-modal embeddings generator as described above. After generating the third set of multi-modal embeddings, the computing device may save the third set of multi-modal embeddings to the associated database. The third set of multi-modal embeddings may contain the complete user-specific intent-interaction history up until the latest user interaction.

At a fourth time 220, the user may contact the company, for example, in response to experiencing an issue relating to their account requiring multiple interactions to obtain a solution. Previous user interactions occurring within the same timeframe and labeled with the same intent may aid in determining current user intent. For example, the user may have first checked their balance through an online portal and discovered an issue, such as an unauthorized transaction. The next day, the user may have checked their account through an app downloaded on their smart phone to see if the issue was resolved. In doing so, the user may have discovered that the issue was not resolved. Frustrated, the user may navigate to the business associated with the account in order to personally speak to a representative of the business. At this interaction, the computing device may, using the time ordered sequence of previous user interaction data, determine that the current user intent may be related to the previous issue and prompt the representative with helpful information.

Additionally, the computing device may analyze, label, and timestamp data from each user instance that occurs at, or around, the fourth time 220. Further, the computing device may generate, using modal-specific encoders and the multi-modal embeddings generator, multi-modal embeddings from each user instance at, or around, the fourth time 220. Further, at each user interaction, the computing device may generate one or more predictions of user intent and a likelihood probability for each prediction. The computing device may save the multi-modal embeddings from each user instance at, or around, the fourth time 220 in the associated database.

Further, at, or around, the fourth time 220, the computing device may generate a complete set of multi-modal embeddings comprising the entire user history and intents from the interactions at first time 205 through, or around, fourth time 220. The computing device may store (save) the complete set of multi-modal embeddings from the interactions at first time 205 through, or around, fourth time 220 to the associated database. Similarly, the computing device may analyze, label, and timestamp data from user instances at fifth time 225, sixth time 230, and seventh time 235, using the techniques described above. The computing device may generate, using modal-specific encoders and the multi-modal embeddings generator, multi-modal embeddings from each user instance at fifth time 225, sixth time 230, and seventh time 235, as described above. Further, the computing device may generate a complete, up-to-date set of multi-modal embeddings since the user opened the account at first time 205. The complete, up-to-date set of multi-modal embeddings may encompass all previous user interaction data relating to user intent at each interaction. The complete, up-to-date set of multi-modal embeddings may be used to determine current user intent at today's user interaction at current time 240. Previously generating a complete set of multi-modal embeddings, incorporating the entire history of user interactions, improves real-time data analysis, enabling the computing device to quickly and efficiently direct the user to the help they desire.

Figure 3:
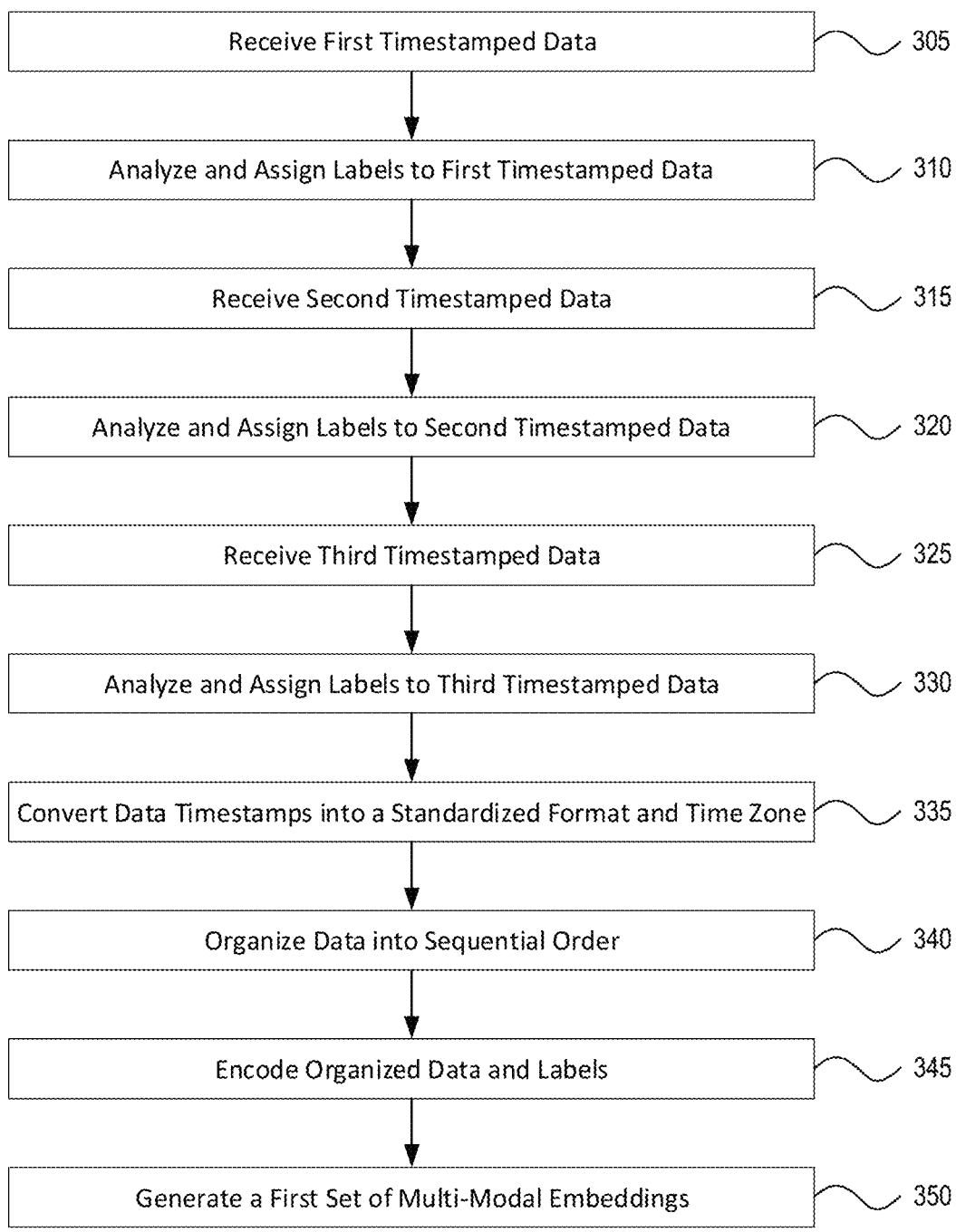
FIG. 3 depicts a flow chart for a method of preparing user data for generating multi-modal embeddings according to one or more aspects of the disclosure.

FIG. 3 illustrates an example method 300 for preparing user interaction data for generating multi-modal embeddings in accordance with one or more aspects described herein. Method 300 may be implemented by any suitable computing device described herein, including, for example, computing devices 101, 105, 107, and/or 109.

At step 305, a computing device (e.g., a server) may receive first timestamped data. Additionally or alternatively, the first timestamped data may be received from an agent, such as a chatbot, an automated voice response system, a help desk operator, etc. The first timestamped data may comprise one or more audio and/or video data from the user discussing an issue with a live person in a conversation. Additionally or alternatively, the data may be transactional data, such as when the user visits in-person to sign documents. The transactional data may also comprise credits and debits from an account. Further, the transactional data may comprise financial statements, such as bank or credit card statements. Further, the timestamped data may comprise user interactions with a chatbot.

At step 310, the computing device may analyze the received first timestamped data. As part of its analysis, the computing device may use the machine learning model and/or multi-modal embeddings to determine a user intent for the first timestamped data, for example, using an AI technology. The AI technology may comprise one or more machine learning models, neural networks, statistical models, decision trees, and/or algorithms. The AI technology may employ multi-modal embeddings and a multi-modal embedding generator, as described above, to determine user intent. In this way, the computing device may determine intent by learning the user's use of any particular colloquialisms, homonyms, polysemes, local dialects, idiomatic expressions, slang, and similar linguistic styles, over time. For example, the first timestamped data comprises transactional data. The computing device may employ an OCR process, as a transactional data encoder, to convert the first timestamped data into a computer readable format and map the transaction data into a common vector space. The computing device may employ a multi-modal embeddings generator to correlate the data within the common vector space to determine intent. The computing device may label (tag, encode) the received first timestamped data with the determined user intent.

At step 315, the computing device may receive second timestamped data. As discussed above, the second timestamped data may be received from a database, a chatbot, an automated voice response system, a help desk operator, etc. The second timestamped data may be the same type of data as the first timestamped data. For example, the first and second timestamped data may both contain audio files of the user interacting with an AVR service. Alternatively, the second timestamped data may comprise data of a different type than the first timestamped data. For example, the second timestamped data may comprise a video format of the user conversing with a live help desk operator, while the first timestamped data may be transactional files from when the user opened their account.

At step 320, the computing device may analyze the received second timestamped data. As discussed above, the computing device may use the machine learning model and/or multi-modal to determine a user intent for the second timestamped data. For example, the computing device may use natural language processing to determine that the user wanted to check an account balance. Further, the computing device may label the second timestamped data to indicate that the user's intent was to check an account balance. The computing device may update the associated database with the labeled second timestamped data. The computing device may also label other information garnered from this (or any) data, such as the length of the interaction, location of the interaction, type of data format, type of interaction, or similar data characteristic.

At step 325, the computing device may receive third timestamped data. The third timestamped data may comprise the same, or a different, data format as the first and/or second timestamped data. For example, the third timestamped data may have originated when the user interacted with a chatbot. The third timestamped data may be in a text format. The first timestamped data may contain notes obtained from when the user opened an account, as well as documents uploaded as part of the enrollment process. The second timestamped data may be an audio file, or a text file of the interaction, of the user's interaction with an automated voice system, for example, when the user checked their account balance.

At step 330, the computing device may analyze the third timestamped data for user intent during the interaction, as described above. The computing device may then label the third timestamped data with the user's intent at the time of the third interaction. Further, while FIG. 3 only shows three datasets, it will be appreciated that more, or fewer, datasets may be used to determine a user's intent and/or sentiment during a current interaction.

At step 335, the computing device may convert the timestamps into a standardize format. For example, the timestamps may be converted using one or more of the following protocols: ANSI ASC X9.95, IETF RFC 3136, ISO 8601, UTC, EPOCH time, Unix time, TAI, NTP, or similar date and timestamp convention. In this regard the first timestamped data may comprise date and/or time information encoded in different time zones, codes, and/or formats. The date format may include information relating to months, days, years, and days of the week, either as a whole word, abbreviation, or code. The date elements may be in any order and contain different punctuations. For example, the date format may be "Thurs Dec. 31, 2009" or "May 22, 2012". Similarly, the time information may give the hour, minute, and second information regarding when the interaction took place and additionally, how long the interaction lasted. The time information may be in 12-hour format or a 24-hour format, with varying punctuation, and in any order. For example, the timestamps may indicate the time as "04:48:52" or "23.02.45." The computing device may employ AI to convert and/or standardize the timestamped data. The AI may include one or more machine learning models, neural networks, statistical models, decision trees, and/or algorithms as described above to covert the timestamps. The computing device may convert the timestamps into any of the standardized formats discussed above. Further, the computing device may label the data with the standardized timestamp.

At step 340, the computing device may organize the first timestamped data, the second timestamped data, and/or the third timestamped data into sequential order. The computing device may employ the AI to time-sequence the data. AI may include one or more machine learning models, neural networks, statistical models, decision trees, and/or algorithms as described above to discussed above to time-sequence the data. Additionally or alternatively, the computing device may use the same AI or different AI to convert the timestamps and to organize the timestamped data into a time-sequenced order. Alternatively, the computing device may convert the data timestamps into a standardized format, for example, when the computing device analyzes and labels the data for user intent. Alternatively, the computing device may time-sequentially order the data after analyzing and labeling the data. For example, at step 320, the computing device may analyze the second timestamped data for user intent, assign the second timestamped data a user intent label, convert the timestamp into a standardized format, and organize the first timestamped data and second timestamped data (both of which now converted into a standardized timestamp format) into a time-sequential order. The computing device may then continue to step 325 and so on.

Figure 4:
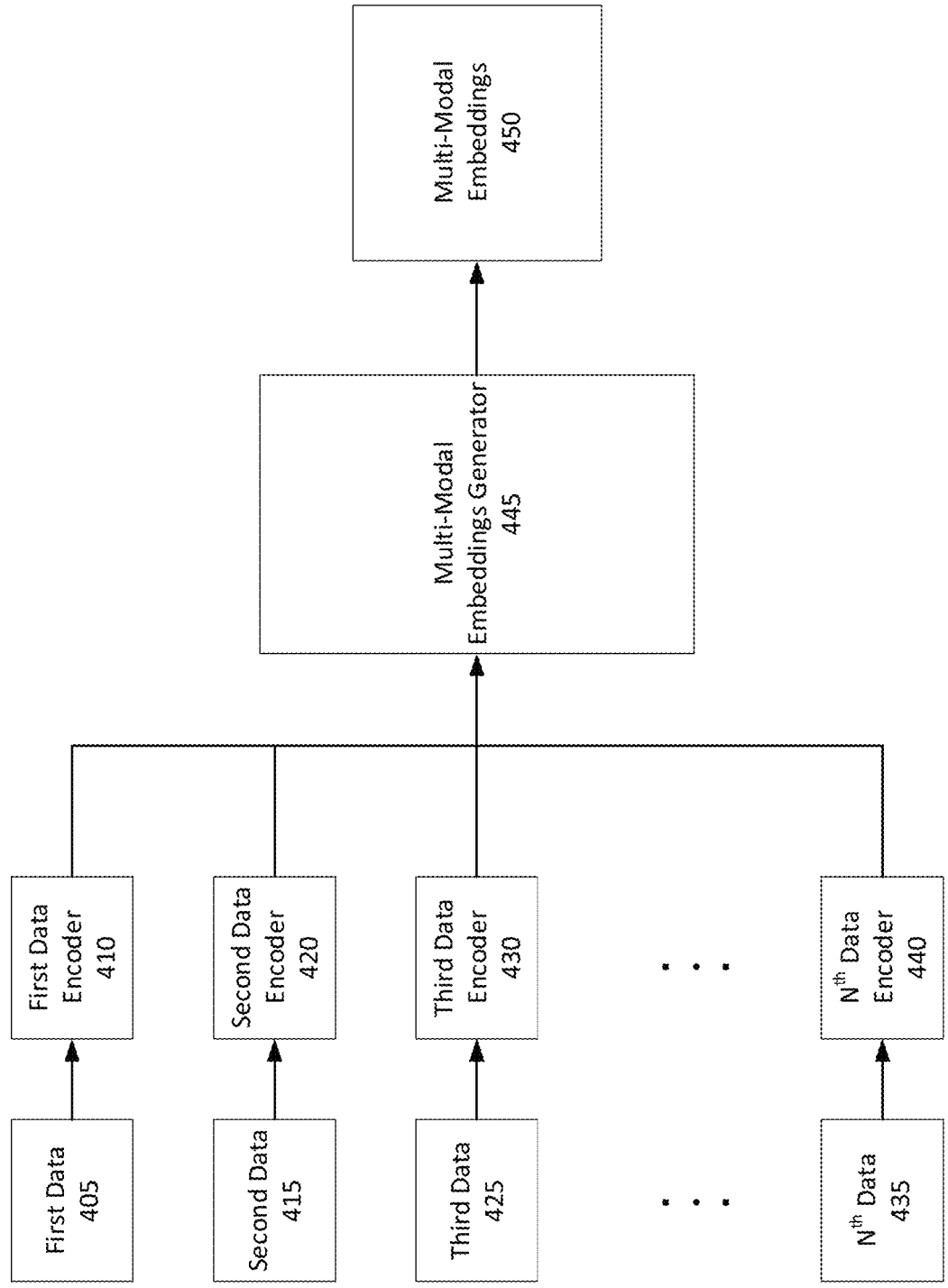
FIG. 4 depicts a flow chart for a method of generating multi-modal embeddings according to one or more aspects of the disclosure.

At step 345, the computing device may encode (convert, map) the organized data and labels using a modal-specific data encoder for use in a multi-modal generator, as discussed further in FIG. 4. The computing device may then generate, at step 350, a first set of multi-modal embeddings using a multi-modal generator, also further discussed in FIG. 4. After generating the multi-modal embeddings, the computing device may use the embeddings to predict current user intent, as further discussed in FIG. 5.

FIG. 4 illustrates an example method 400 for generating multi-modal embeddings in accordance with one or more aspects described herein. Method 400 may be implemented by any suitable computing device described herein, including, for example, computing devices 101, 105, 107, and 109.

As shown in FIG. 4, a computing device may comprise four data encoders (e.g., first data encoder 410, second data encoder 420, third data encoder 430, $n^{th}$ data encoder 430) and a multi-modal embeddings generator 445. The four data encoders (e.g., first data encoder 410, second data encoder 420, third data encoder 430, $n^{th}$ data encoder 430) and multi-modal embeddings generator 445 may receive four sets of input data (e.g., first data 405, second data 415, third data 425, $n^{th}$ data 435) and output multi-modal embeddings 450. The data encoders (e.g., first data encoder 410, second data encoder 420, third data encoder 430, $n^{th}$ data encoder 430) may use one or more of natural language processing, language modeling, recurrent neural networks (RNNs), feed-forward neural networks, long short-term memory (LSTM), gated recurrent units (GRUs), masked language models (MLMs), hidden Markov models (HMMs), regression models, and/or correlation analysis. Additionally and/or alternatively, the multi-modal embeddings generator 445 may comprise further AI, such as machine learning models, neural networks, statistical models, decision trees, and/or algorithms, as described above.

After analyzing the received timestamped data for user intent, labelling the timestamped data with the identified user intent, and/or organizing the data sequentially, a computing device (e.g., a server) may encode the timestamped data and associated intent labels with one or more modal-specific data encoders, as shown in FIG. 4. For example, first data 405 may be generated during a first user interaction, for example, such as when the user opened an account. The data may comprise (include) documents uploaded during the account creation process. According to this example, first data encoder 410 may be a transaction data encoder.

Similarly, the second data 415 may be generated during a second user interaction, for example, when the user called an automated line to check their account balance. The second user interaction may occur after the first user interaction. Second data 415 may be audio data. According to this example, second data encoder 420 may be an audio data encoder. Likewise, the third data 425 may be generated based on a third user interaction, for example, when the user interacted with a chatbot. Third data encoder 430 may comprise an encoder specific to the particular chatbot. As shown in FIG. 4, the computing device may comprise additional encoders, such as $n^{th}$ data encoder 440 for further $n^{th}$ data 435. Further, $n^{th}$ data 435 may comprise graphs, databases, images, text, and the like. The computing device may parse different data structures and/or encode with modal-specific data encoders. While four data inputs and four corresponding encoders are shown in FIG. 4, it will be appreciated the more, or fewer, data inputs and corresponding encoders may be used to generate the multi-modal embeddings 450.

After encoding the data and/or mapping the data and associated labels into the shared embeddings space, the computing device may generate, using multi-modal embeddings generator 445, multi-modal embeddings 450. The multi-modal embeddings generator 445 may employ one or more of natural language processing, language modeling, recurrent neural networks (RNNs), feed-forward neural networks, long short-term memory (LSTM), gated recurrent units (GRUs), masked language models (MLMs), hidden Markov models (HMMs), regression models, and/or correlation analysis. Additionally or alternatively, the multi-modal embeddings generator 445 may use a clustering algorithm. In some examples, the multi-modal embeddings generator 445 may comprise further AI, such as machine learning models, neural networks, statistical models, decision trees, algorithms, and/or embedding encoders as described above.

The multi-modal embeddings generator 445 may correlate the first set of data and the one or more first labels with the second set of data and the one or more second labels and the third set of data and the one or more third labels. Further, multi-modal embeddings generator 445 may generate the multi-modal embeddings 450 such that the multi-modal embeddings 450 maintain the sequential order of the data. Additionally and/or alternatively, the multi-modal embeddings generator 445 may use a clustering algorithm to cluster the data by intent. The multi-modal embeddings generator 445 may use k-means clustering, k-modes clustering, hierarchical clustering, non-hierarchical clustering, DBSCAN, a Gaussian mixtures model, or another other clustering method.

Figure 5:
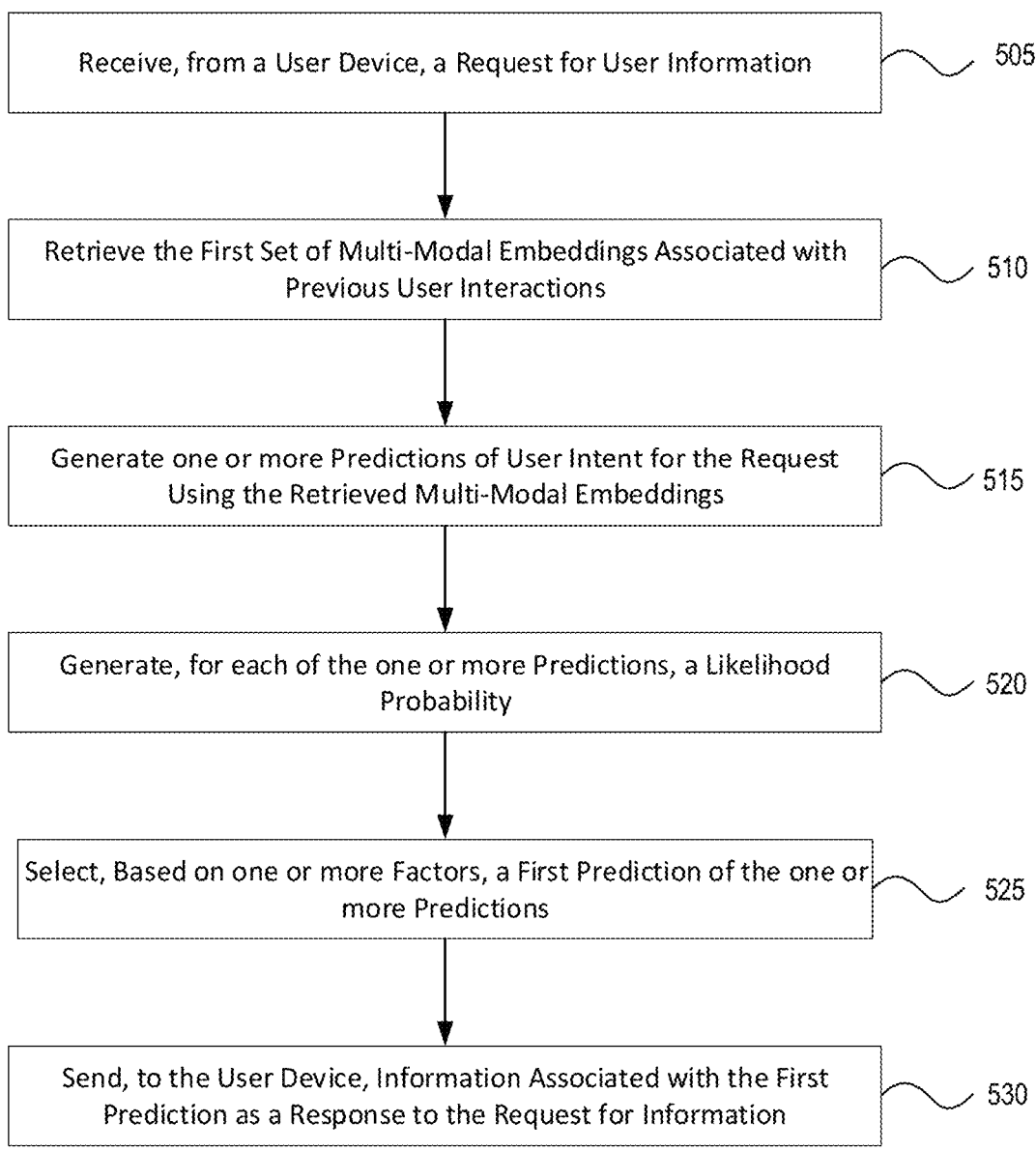
FIG. 5 depicts a flow chart for a method of predicting a user's intent during a real-time interaction according to one or more aspects of the disclosure.

After generating the multi-modal embeddings 450, the computing device may save, in an associated database, the multi-modal embeddings 450. The computing device may retrieve the multi-modal embeddings 450 for predicting, in real-time, user intent during a user interaction. FIG. 5 illustrates an example method 500 for predicting, in real-time, user intent using multi-modal embeddings in accordance with one or more aspects described herein. Method 500 may be implemented by any suitable computing device described herein, including, for example, computing devices 101, 105, 107, and 109.

In step 505, a computing device (e.g., a server) may receive, from a user device, a request for user information. The user device may be an electronic device, such as a desktop computer, a computer server, a mobile device (e.g., a laptop computer, a tablet computer, a smart phone, any other types of mobile computing devices, and the like), and/or any other type of electronic device. The request for information may comprise information regarding an account, a request to discuss an issue related to an account, a response to a fraudulent activity notification, and/or similar user requests. When receiving a request for user information, the computing device may identify the user in order to retrieve previously generated multi-modal embeddings, unique to the user. The computing device may identify the user by one or more phone numbers, account numbers, names, Know Your Customer (KYC) information, login credentials, or any other user identifying feature. Additionally or alternatively, the computing device may employ one or more tracking methods, such as tracking cookies, to obtain information about the user from the user device. Additionally, after the user logs into an account using, for example—a Single Sign On portal (SSO) or a similar authentication log-in method, the computing device may acquire information unique to the user, such as browsing history and/or engagement data. Further, the computing device may retrieve, after establishing the user's identity, further demographic information from previously submitted transactional documents stored in an associated database.

In step 510, the computing device may retrieve, from the associated database, the first set of multi-modal embeddings associated with the user. Alternatively, if the multi-modal embeddings have not been generated, the computing device may generate user-specific multi-modal embeddings, for example, using the techniques discussed in FIG. 3 above.

In step 515, the computing device may input the multi-modal embeddings into a trained machine learning model to generate one or more predictions of current user intent. The computing device may also input information received in the user's request for information into the trained machine learning model. Further, information from recent interactions with other users may also be utilized as input to the machine learning model. The other users may be geographically local to the user. Additionally and/or alternatively, the other users may be similar to the user in age, family status, financial status, educational attainment, job level, socioeconomic status, and/or other personal characteristics and demographics.

In step 520, the computing device may generate, for each of the one or more predictions of user intent, a likelihood of probability. The computing device may use a trained machine learning model, such as those discussed above, for generating a likelihood probability for each of the one or more predictions. Further, the computing device may use any artificial neural network, or similar AI, machine learning, or neural network architecture to determine the likelihood probability for each of the one or more predictions. In some instances, the computing device may determine the likelihood probability for each of the one or more predictions, for example, when generating each of the one or more predictions at step 515.

In step 525, the computing device may select, based on one or more factors, a first prediction of the one or more predictions of user intent. The one or more factors may comprise comparing the generated likelihood probability for each of the one or more predictions and selecting the prediction with the highest likelihood of probability. In other instances, the computing device may select a first prediction, of the one or more predictions of user intent, based on factors, such as other user's intents, current events related to the subject at hand, and other related factors.

In step 530, the computing device may send, to the user device, information associated with the selected first prediction as a response to the request for information. Using the selected first prediction, the computing device may retrieve information from the associated database associated with the selected first prediction. For example, based on selecting the first prediction, the computing device may select one or more responses to send to the user device, for example, in response to the request for information. The one or more responses may be pre-established, or canned, responses. The one or more responses may comprise a transfer notification, an offer, an advertisement, one or more responses for a chatbot to respond to a user inquiry, and/or an option to speak to a customer service representative. In other instances, if the first prediction indicates that the user is calling about a possible fraudulent activity associated with the user's account, the computing device may send, to the user, a notification that the user will be transferred to a live agent specializing in cybersecurity and/or fraudulent transactions. Additionally or alternatively, the computing device may present, to the user, one or more options to choose from, such as, recommended phrases for responding to a chatbot.

Further, the computing device may request the user to confirm the selected first prediction as their current intent for the interaction. The computing device may, based on feedback from the user, update one or more trained machine learning models used during this method. Updating a trained machine learning model may comprise updating the training datasets with user feedback and retraining the machine learning model with the updated training datasets. Further, the computing device may, based on feedback from the user, update the generated multi-modal embeddings, thereby maintaining the embedding's unique-to-the-user characteristic.

Some aspects described herein may provide benefits for generating multi-modal embeddings used to analyze, in real-time, user intent, such as: improved accuracy in determining the user's meaning by recognizing synonymous terms and interrelated subject and correctly determine, in real-time, the user's meaning. Further, the disclosed method may improve analyzation speed for real-time determinations. This may have the effect of improving user retention rates, increase business efficiencies, and improve consumer confidence.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
analyzing, by a server based on an interaction between a user and a webpage and using natural language processing, a first data to assign one or more first labels to the first data;
analyzing, based on an interaction between the user and an agent and using natural language processing, a second data to assign one or more second labels to the second data, wherein the analysis comprises organizing the first data and the second data into a sequential order;
generating, by an embedding encoder, multi-modal embeddings that correlate the first data and the one or more first labels with the second data and the one or more second labels;
receiving, by the server and from a user device, a request for information;
generating, in response to receiving the request for information and based on one or more correlations between the first data and the one or more first labels with the second data and the one or more second labels, one or more predictions regarding an intent associated with the user for the request for information, wherein each of the one or more predictions comprises a likelihood probability; and
based on a determination of a first prediction of intent associated with the user, sending, to the user device, a response to the request for information.

2. The method of claim 1, wherein the agent comprises one or more of an automated voice response (AVR) service, a chatbot, or a customer service representative.

3. The method of claim 1, further comprising:
analyzing, based on transaction data associated with the user and using natural language processing, third data to assign one or more third labels to the third data, wherein the analysis of the third data comprises sequentially organizing the third data with the sequentially ordered first data and second data; and
generating, by the embedding encoder, second multi-modal embeddings that correlate the third data and the one or more third labels with the first data and the one or more first labels and the second data and the one or more second labels.

4. The method of claim 1, wherein the embedding encoder comprises one or more of natural language processing, recurrent neural networks (RNNs), feed-forward neural networks, long short term memory (LSTM), gated recurrent units (GRUs), hidden Markov models (HMMs), regression models, and correlation analysis.

5. The method of claim 1, wherein the response to the request for information comprises at least one of:
a transfer notification;
an offer;
one or more responses to a chatbot; or
an option to speak to a customer service representative.

6. The method of claim 1, wherein the first data comprises text data.

7. The method of claim 1, wherein the second data comprises audio data.

8. The method of claim 1, wherein organizing the first data and the second data into a sequential order further comprises:
converting a first plurality of timestamps associated with the first data into a first format;
converting a second plurality of timestamps associated with the second data into the first format; and
sequentially organizing, based on the first plurality of converted timestamps and based on the second plurality of converted timestamps, the first data and the second data.

9. The method of claim 1, further comprising:
mapping, using a first data encoder, the first data and the one or more first labels to a common vector space; and
mapping, using a second data encoder, the second data and the one or more second labels to the common vector space.

10. The method of claim 1, wherein the generating the one or more predictions regarding the intent associated with the user comprises employing multi-modal embeddings associated with one or more second users to determine the intent associated with the user.

11. The method of claim 1, wherein:
the one or more first labels correspond to a first predicted user intent associated with the interaction between the user and the webpage, and
the one or more second labels correspond to a second predicted user intent associated with the interaction between the user and the agent.

12. A non-transitory computer-readable medium storing instructions that, when executed, cause a server to:
analyze, based on an interaction between a user and an agent and using natural language processing, a first data to assign one or more first labels to the first data, wherein the one or more first labels comprise a predicted user intent label;
analyze, based on transaction history associated with user and using natural language processing, a second data to assign one or more second labels to the second data, wherein the analysis comprises organizing the first data and the second data into a sequential order;
generate, by an embedding encoder, multi-modal embeddings that correlate the first data and the one or more first labels with the second data and the one or more second labels;
receive, from a user device, a request for information;
generate, in response to receiving the request for information and based on one or more correlations between the first data and the one or more first labels with the second data and the one or more second labels, one or more predictions regarding an intent associated with the user for the request for information, wherein each of the one or more predictions comprises a likelihood probability; and
based on a determination of a first prediction of intent associated with the user, send, to the user device, a response to the request for information.

13. The non-transitory computer-readable medium of claim 12, wherein:
the interaction between the user and the agent comprises a phone call with a customer service representative, and
the instructions, when executed, cause the server to:
convert, using a speech-to-text algorithm, the phone call with the customer service representative to the first data prior to analyzing the first data to assign the one or more first labels.

14. The non-transitory computer-readable medium of claim 12, wherein the interaction between the user and the agent comprises a conversation with a chatbot.

15. The non-transitory computer-readable medium of claim 12, wherein the response to the request for information comprises at least one of:
a transfer notification;
an offer;

one or more responses to a chatbot; or an option to speak to a customer service representative.

16. The non-transitory computer-readable medium of claim 12, wherein the first data comprises text data and the second data comprises audio data.

17. The non-transitory computer-readable medium of claim 12, wherein the instructions to organize the first data and the second data into a sequential order, when executed, cause the server to:

convert a first plurality of timestamps associated with the first data into a first format;

convert a second plurality of timestamps associated with the second data into the first format; and sequentially organize, based on the first plurality of converted timestamps and based on the second plurality of converted timestamps, the first data and the second data.

18. The non-transitory computer-readable medium of claim 12, wherein the instructions to organize the first data and the second data into a sequential order, when executed, cause the server to:

map, using a first data encoder, the first data and the one or more first labels to a common vector space; and map, using a second data encoder, the second data and the one or more second labels to the common vector space.

19. A server comprising:

one or more processors; and memory storing instructions that, when executed by the one or more processors, cause the server to:

analyze, based on an interaction between a user and a webpage and using natural language processing, a first data to assign one or more first labels to the first data, wherein the one or more first labels comprise a predicted user intent label;

analyze, based on an interaction between the user and an agent and using natural language processing, a second data to assign one or more second labels to the second data, wherein the one or more second labels comprise a predicted user intent label;

analyze, based on transaction history associated with the user and using natural language processing, third data to assign one or more third labels to the third data;

organize the first data, the second data, and the third data into a sequential order;

generate, by an embedding encoder, multi-modal embeddings that correlate the first data and the one or more first labels with the second data and the one or more second labels and the third data and the one or more third labels;

receive, from a user device, a request for information;

generate, in response to receiving the request for information and based on one or more correlations between the first data and the one or more first labels, the second data and the one or more second labels, and the third data and the one or more third labels, one or more predictions regarding an intent associated with the user for the request for information, wherein each of the one or more predictions comprises a likelihood probability; and based on a determination of a first prediction of intent associated with the user, send, to the user device, a response to the request for information.

20. The server of claim 19, wherein the interaction with the agent comprises a phone call with a customer service representative, and the instructions, when executed, cause the server to:

convert, using a speech-to-text algorithm, the phone call with the customer service representative to the first data prior to analyzing the first data to assign the one or more first labels.

* * * * *